United States Patent
Chowdhary et al.

(10) Patent No.: US 8,882,595 B2
(45) Date of Patent: Nov. 11, 2014

(54) SYSTEMS AND METHODS OF IMPORTING VIRTUAL OBJECTS USING BARCODES

(75) Inventors: Yousuf Chowdhary, Maple (CA); Oliver (Lake) Watkins, Jr., Toronto (CA); Jeffrey Brunet, Richmond Hill (CA); Ravinder (Ray) Sharma, Richmond Hill (CA)

(73) Assignee: 2343127 Ontartio Inc., Toronto, Ontario (CA)

( * ) Notice: Subject to any disclaimer, the term of this patent is extended or adjusted under 35 U.S.C. 154(b) by 0 days.

(21) Appl. No.: 13/456,716

(22) Filed: Apr. 26, 2012

(65) Prior Publication Data

US 2012/0276997 A1  Nov. 1, 2012

Related U.S. Application Data (60) Provisional application No. 61/517,951, filed on Apr. 29, 2011.

(51) Int. Cl.
   *A63F 9/24*     (2006.01)
   *A63F 13/40*    (2014.01)

(52) U.S. Cl.
   CPC ............. *A63F 13/10* (2013.01); *A63F 2300/69* (2013.01); *A63F 2300/609* (2013.01)
   USPC .................................. 463/36; 463/9; 463/43

(58) Field of Classification Search
   USPC ................................................ 463/9, 36, 43
   See application file for complete search history.

(56) References Cited

U.S. PATENT DOCUMENTS

| | | | | |
|---|---|---|---|---|
| 5,212,368 | A  * | 5/1993  | Hara | 235/375 |
| 7,564,469 | B2   | 7/2009  | Cohen | |
| 2006/0258450 | A1* | 11/2006 | Ishihata et al. | 463/31 |
| 2008/0076569 | A1* | 3/2008  | Tabata | 463/41 |
| 2008/0139309 | A1* | 6/2008  | Siegel et al. | 463/31 |
| 2009/0082076 | A1* | 3/2009  | Annunziata | 463/1 |
| 2009/0104992 | A1* | 4/2009  | Kouno | 463/36 |
| 2012/0122570 | A1* | 5/2012  | Baronoff | 463/31 |

OTHER PUBLICATIONS

"Wikipedia Barcode Battler". From Wikipedia, The Free Encylopedia. [online], [retrieved on Jun. 29, 2014]. Retrieved from the Internet <URL:http://en.wikipedia.org/wiki/Barcode_Battler>. 4 pages.*

"Wikipedia Skannerz". From Wikipedia, The Free Encylopedia. [online], [retrieved on Jun. 29, 2014]. Retrieved from the Internet <URL:http://en.wikipedia.org/wiki/Skannerz>. 3 pages.*

"Skannerz Manual", [dated 2001]. [online], [retrieved Jun. 29, 2014]. Retrieved from the Internet <URL:https://web.archive.org/web/20051102093050/http://www.radicagames.com/manuals/71051.pdf>. 4 pages.*

"Skannerz Codes", [dated 2014]. [online], [retrieved Jun. 29, 2014]. Retrieved from the Internet <URL:http://www.consoledatabase.com/cheats/handheldgames/skannerz/>. 6 pages.*

(Continued)

*Primary Examiner* — Lawrence Galka (57) ABSTRACT

A method is provided for enabling virtual gameplay. A game environment is provided in which a player can play a game via a character. When the player scans a barcode from a real world object, a virtual object is retrieved based on the barcode input. The player's character can then own or interact with the virtual object in the game environment.

26 Claims, 3 Drawing Sheets

| Real object name (A) | Virtual object name (B) | Barcode Digital Representation (C) | Statistics & Effects (D) | Digital representation of the virtual object (E) |
|---|---|---|---|---|
| Can of Spinach | Can of Whupass | 0xA7CF | +100 Strength | A cylinder textured like a tin can with a built in can-opener in the shape of a strong arm. |
| Prescription Eyeglasses | Keeneye Lens | 0x8B03 | +10 Perception, Sees Through Illusions | Either glasses, a monocle, binoculars, or a telescope depending on the game setting. |
| Electronic Plane Ticket | Roc's Feather | 0xED15 | Flight, or +1 Fly Speed | A large grey feather with an almost metallic sheen. |

(56) References Cited

OTHER PUBLICATIONS

Barcode Battler—Wikipedia, the free encyclopedia, website: http://en.wikipedia.org/wiki/Barcode_Battler, webpage updated Jul. 20, 2011, article, 3 sheets.

"What's the Best Beastie You've Found?", website: http://online.barcodebeasties.com/web/instructions, copyright 2011, Barcode Beasties, 1 sheet.

List of Barcode Games—Wikipedia, the free encyclopedia, website: http://en.wikipedia.org/wiki/List_of_barcode_games, webpage updated Aug. 10, 2011, 3 sheets.

Brown, Christopher, "NFC will catch on like wildfire says Sundance festival game creator", website: http://www.nfcworld.com/2011/03/20/36516/nfc-will-catch-on-like-wildfire-says-sundance-festival-game-creator, Near Field Communications World, Mar. 20, 2011, article, 3 sheets.

Global Trade Item Number—Wikipedia, the free encyclopedia, website: http://en.wikipedia.org/wiki/Global Trade Item Number, article, webpage updated Mar. 22, 2012, 4 sheets.

GS1 Canada, "Become a Member", website: http://www.gs1ca.org/page.asp?intNoteIID=1275&intPageID=1530, copyright GS1 Canada 2012, 1 sheet.

QR Code—Wikipedia, the free encyclopedia, website: http://en.wikipedia.org/wiki/QR_code, webpage updated Apr. 8, 2012, 11 sheets.

Skannerz—Wikipedia, the free encyclopedia, website: http://en.wikipedia.org/wiki/Skannerz, webpage updated Aug. 7, 2011, article, 3 sheets.

Universal Product Code—Wikipedia, the free encyclopedia, website: http://en.wikipedia.org/wiki/Universal Product Code, webpage update Mar. 5, 2012, article, 7 sheets.

UPC Database, website: http://www.upcdatabase.com/, last visited Apr. 2012, 5 sheets.

UPC Database, website: http://www.upcdatabase.com/item/036000258448, Jul. 25, 2011, 3 sheets.

\* cited by examiner

| Real object name (A) | Virtual object name (B) | Barcode Digital Representation (C) | Statistics & Effects (D) | Digital representation of the virtual object (E) |
|---|---|---|---|---|
| Can of Spinach | Can of Whupass | 0xA7CF | +100 Strength | A cylinder textured like a tin can with a built in can-opener in the shape of a strong arm. |
| Prescription Eyeglasses | Keeneye Lens | 0x8B03 | +10 Perception, Sees Through Illusions | Either glasses, a monocle, binoculars, or a telescope depending on the game setting. |
| Electronic Plane Ticket | Roc's Feather | 0xED15 | Flight, or +1 Fly Speed | A large grey feather with an almost metallic sheen. |

FIG. 3

SYSTEMS AND METHODS OF IMPORTING VIRTUAL OBJECTS USING BARCODES

CROSS REFERENCE TO RELATED APPLICATION

This application claims priority from U.S. Provisional Application No. 61/517,951 filed on Apr. 29, 2011, which is incorporated by reference in its entirety herein.

FIELD OF INVENTION

The present invention is related to video game applications in general and importing of virtual objects in video game applications using barcodes in particular.

BACKGROUND

A virtual world is a computer simulated environment. A virtual world may resemble the real world, with real world rules such as physical rules of gravity, geography, topography, and locomotion. A virtual world may also incorporate rules for social and economic interactions between virtual characters. Players (users) may be represented as avatars, two or three-dimensional graphical representations. Virtual worlds may be used for massively multiple online role-playing games, for social or business networking, or for participation in imaginary social universes.

Virtual objects are non-physical objects in virtual worlds, online communities or online games. Virtual objects may include but are not limited to virtual characters, avatars, digital clothing for avatars, weapons, tokens, digital gifts, etc. or any other virtual objects used for gameplay.

Barcodes are commonly found on consumer products and may be used for inventory control and assistance in entering pricing at the retail checkout counters. Usage of barcodes is well understood in the art, but has not been widely used in the gaming arts.

It would be desirable to link the extensive real world product information data available through barcodes into a virtual world environment where virtual objects can have real world verisimilitude as well as more fanciful or magical characteristics.

SUMMARY

This application describes systems and methods for importing virtual objects into virtual worlds by using barcodes, whereby the player can interact with the imported virtual objects in the virtual world. For example in one embodiment of the invention a player can scan the barcode on a can of soup to import a "virtual can of soup" into the virtual world and then can use the soup to feed a virtual character to improve its health.

Using the methods and systems disclosed in this application a more interesting way to import and interact with the virtual objects using barcodes are presented. In one embodiment of the invention the player scans a barcode on a real world object, the barcode information is sent to a backend server and the backend server after deciphering the barcode information sends to the gaming device a virtual object that corresponds to the barcode. In another variation of the invention, the server instead sends statistics to the gaming device that can be deciphered by the virtual world as a virtual object. In yet another embodiment of the invention the statistics for a virtual object are deciphered from a 2D barcode without requiring a backend server. In yet another variation of the invention, the virtual objects may be embedded and dormant in the virtual world, and upon scanning of the barcode, a corresponding or random virtual object is invoked from these dormant virtual objects.

This provides for a richer gaming experience and increases player engagement while making the gameplay of the virtual world more involved. The systems and methods described here enable a player to have a unique and more enjoyable gaming experience.

According to a first aspect of the invention, a method is provided for enabling virtual gameplay. A game environment is provided in which a player can play a game via a character. When the player scans a barcode from a real world object, a virtual object is retrieved based on the barcode input. The player's character can then own or interact with the virtual object in the game environment.

In order to assign the virtual object, a database of barcodes may first be queried. The virtual object may be imported from a virtual object database, or statistics representing the virtual object may be imported from a virtual object database.

In another embodiment, the virtual object may not be imported but simply unlocked or made available in the game environment.

At least one player character statistic may be increased or decreased as a consequence of retrieving the virtual object.

The retrieving step may include determining a general category or class of the scanned real world object. In this case, the virtual object can be assigned from an equivalent or similar general category or class.

Other data can also be retrieved at the same time as the real world object is scanned. For example, the location of the real world object or the player may be retrieved, and this location may then be incorporated into the gameplay of the game. In another example, a price or value of the real world object may be retrieved (e.g. from a separate database keyed to barcodes), and the price or value may be represented in the character's points or treasury or in other currency of the game.

The barcode information will link to information about the real world object and certain game outcomes can be based around this. For example, it may be determined that the real world object is consumable, and in the game, the character may be able to consume the virtual object. For example, the real world object may be a food, and the character can be shown in the game environment eating or having eaten the food. Eating the food may then increase or decrease at least one player character statistic (e.g. health, strength, weight).

Alternatively, the real world object may be a non-food item, but the character in the game may be able to consume the (corresponding) virtual object. In this case, the character may be shown in the game environment experiencing a magical, drugged, toxic, or poisoned effect from eating or having eaten the non-food item. Further, consuming the item may increase or decrease at least one player character statistic (e.g. health, strength, weight).

Retrieval of the barcode may occur during or before the start of the game.

Retrieval of the barcode may be initiated by the player or directed by the game environment (e.g. in response to a scarcity or low value of at least one statistic in the game).

The game environment may direct what type of real world object should be scanned. For example, the game environment may include a treasure hunt or scavenger hunt motif. The virtual object may be retrieved with other virtual objects as a set or in a particular order for a game purpose.

A graphical representation of the real world object may be retrieved (e.g. a user photo or retrieved graphic of the object from a database of product images).

The data storage is preferably provided by one or a combination of: a local fixed memory, a local removable memory, a remote fixed memory, a remote removable memory, and a virtual memory. For example: a local data storage of a game console, a local inbuilt memory, a user provided memory, an online server, and a shared folder on a network.

Various hardware and software implementations are possible. In one embodiment, the player may be enabled to play the game using a game device. In that case, the barcode may be scanned by an on-board scanner or camera on the game device.

The game device may be a mobile device (such as any type of portable electronic device—a mobile phone or smartphone, a handheld music player (e.g. iPod), a portable game device/console, a portable computer or laptop, a tablet computer, etc.).

DETAILED DESCRIPTION

Methods and arrangements for importing virtual objects into virtual worlds using barcodes are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in details, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Linux, Google Android or another operating system. This list is not exhaustive but is exemplary of devices or computing environments where virtual worlds can exist, many other variations are available and known to the ones skilled in the art.

A computer or a game console that enables a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

The term "player" is intended to describe any entity that accesses the virtual world, regardless of whether or not the player intends to or is capable of competing against other players. Typically, a player will register an account with the game console within a peer-to-peer game and may choose from a list or create virtual characters that can interact with other virtual characters of the virtual world.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

Typically, a user or a player manipulates a game controller to generate commands to control and interact with the virtual world. The game controller may include conventional controls, for example, control input devices such as joysticks, buttons and the like. Using the controller a user can interact with the game, such as by using buttons, joysticks, and movements of the controller and the like. This interaction or command may be detected and captured in the game console. The user's inputs can be saved, along with the game data to record the game play.

Another method to interact with a virtual world is using the touch screen for interaction with the virtual world. A gesture refers to a motion used to interact with multipoint touch screen interfaces. Multi-touch devices employ gestures to perform various actions.

A "virtual object" may include any one of a virtual character, a virtual good, a weapon, a vehicle, virtual currency, experience points and permissions, etc. A virtual object may further be any item that exists only in a virtual world (game).

A virtual object may include virtual money, experience points, weapons, vehicles, credentials, permissions and virtual gold. A player's online persona may obtain these virtual objects through gameplay, purchase or other mechanisms. For example, as a player of a first person shooter completes various levels of the game, he obtains additional weapons, armour, outfits, experience points and permissions. Additional weapons and armour which may be beneficial in facilitating the completion of levels and allow the player to perform in new and different ways may be acquired (i.e. purchased). Additional permissions may unlock additional levels of the game or provide access to an otherwise hidden forum or stage. Whatever the items, players are constantly in search of virtual objects so as to enrich their game experience.

A "virtual character" may include a persona created by a player or chosen from a list in the virtual world. Typically virtual characters are modeled after humans whether living or fantasy (e.g. characters from mythology). A virtual character (which can be considered a special type of virtual object) is represented by one or more gameplay statistics, which encapsulate some meaning to connect the virtual (and digital) reality of the game to the real world. Many of these statistics are not apparent to the player as such, but are instead encoded within the framework of the game or composed together to form a script. In role-playing games (RPGs) and similar games, these statistics may be explicitly exposed to the player through a special interface, often with added meaning which provides context for the player's actions.

A "statistic" (stat) is a datum which represents a particular aspect of a virtual character. Most virtual worlds separate statistics into several categories. The set of categories actually used in a game system, as well as the precise statistics within each category may vary greatly from one virtual world to another. Many virtual worlds also use derived statistics whose values depend on other statistics, which are known as primary or basic statistics. Derived statistics often represent a single capability of the character such as the weight a character can lift, or the speed at which they can move. Derived statistics are often used during combat, can be unitless numbers, or may use real-world units of measurement such as kilograms or meters per second.

A virtual character's statistics affects how it behaves in a virtual world. For example, a well-built muscular virtual character may be more powerful and be able to throw certain virtual objects farther, but at the same time may lack dexterity when manoeuvring intricate virtual objects. A virtual character may have any combination of statistics, but these statistics may be limited by either hard counters, soft counters or a combination of both.

"Primary statistics" represent assigned, abstract qualities of a virtual character, such as strength, or intelligence. Partially defined by convention and partially defined by context, the value of a primary statistic corresponds to a few direct in-game advantages or disadvantages, although a higher statistic is usually better. In this sense, primary statistics can only really be used for direct comparison or when determining indirect advantages and disadvantages.

"Derived statistics" represent measured, concrete qualities of a virtual character, such as maximum carry weight, perceptiveness, or skill with a weapon. Such a stat is derived from some function of one or more of a character's primary stats, usually addition or multiplication. These stats then serve an important function in turn, providing a fair means by which to arbitrate conflicts between virtual characters and the virtual environment. For example, when two virtual characters are in violent conflict, strength, a primary statistic, might be used to calculate damage, a derived statistic, with the winner being the character that inflicts the most damage on the other.

Other factors may affect derived statistics, such as other derived or primary statistics, or even environmental factors, such as weather conditions. In these cases, the environment can be modeled as a virtual character with its own primary statistics or it may be given a special role in conflict resolution. Whatever-the-case, the role of primary statistics should remain clear because this is the primary interface by which players understand their interactions within the virtual world.

Some statistics deserve special mention. "Health (or Hit Points) vs. Damage," describes a gameplay mechanic that has fixated the current generation of games. Damage refers to a primary or (usually) derived statistic that represents a character's ability to destroy or cause harm to the environment or virtual characters. Likewise, Health (or Hit Points) refers to a primary or (usually) derived statistic that represents a character's ability to withstand damage and continue to function normally. Each time a character suffers damage, that amount of damage is subtracted from their remaining health or hit point total, and if this total is now zero or less, the character is eliminated or the player loses.

The most often used types of statistic include but are not limited to the following:

An "attribute" describes to what extent a virtual character possesses a natural, in-born characteristic common to all virtual characters in the game. "Ability" defines a quality in a virtual character to perform certain actions, for example wield a sword or to run. Many games use attributes to describe a virtual characters' physical and mental characteristics, for example their strength or wisdom. Many games also include social characteristics as well, for example a character's natural charisma or physical appearance which often influence the chance to succeed in a particular challenge. Some games work with only a few broad attributes, while others may have several more specific ones.

"Traits" may be stable personal characteristics (i.e., temperament or physical endowment) that are additional qualities that help define a virtual character. Traits can be positive or negative. Traits also affect the ability to build particular skills. For instance, an active virtual character will find it easier to develop a more muscular body than an inactive one. Generally a trait represents a broad area of expertise of a character.

A "skill" represents the learned knowledge of a virtual character. Skills are manifestations of abilities and traits. During the creation of a virtual character, skills are generally chosen from a list. A virtual character may have a fixed number of starting skills, or a player can acquire them by spending game points. Each skill has an associated attribute and can be improved upon by practicing. For example if a virtual character has the ability to wield a sword and has the trait of being physically strong then the skill of being a swordsman can be accomplished by practicing wielding the sword. As opposed to abilities few games set a player's skills at the start of the game, instead allowing players to increase them by playing the game and spending game points or during moving from a low level to a higher level in the game. Some skills are likely to be more useful than others therefore different skills often have different costs in terms of game points.

An "advantage" is a physical, social, intellectual, or other enhancement to a virtual character, while a disadvantage is an adverse effect. Advantages are also known as virtues, merits or edges and disadvantages as flaws or hindrances. Many games encourage or even force players to take disadvantages for their characters in order to balance their advantages or other positive statistics.

"Powers" represent unique or special qualities of a virtual character and often grant the virtual character the potential to gain or develop certain advantages or to learn and use certain skills.

The term "avatar" is used herein to describe at least the physical embodiment of a virtual character in the virtual world.

For the purpose of this application the term "gameplay statistics" refers to any one or any combination of gameplay frequency, gameplay time, number of times game played, percent game complete etc. as result of engaging in gameplay.

In virtual worlds (video/computer games) a "non-player character" (NPC) is a virtual character that is controlled by the program and not a player. NPC may also refer to other entities not under the direct control of players. NPC behaviour in a virtual world may be scripted and automatic.

A "player character" or "playable character" (PC) is a virtual character in a virtual world that is controlled or controllable by a player. A player character is a persona of the player who controls it. In some cases, a virtual world has only one player character and in other cases there may be a small number of player characters from which a player may pick a certain virtual character that may suit his or her style of gameplay, while in other scenarios there may be a large number of customizable player characters available from which a player may choose a virtual character of their liking.

Virtual objects in a virtual world interact with the player, the virtual environment, and each other. This interaction is generally governed by a physics engine which enables realism in modeling physical rules of the real world (or arbitrary fantasy worlds). A physics engine is a computer program that, using variables such as mass, force, velocity, friction and wind resistance may simulate and predict effects under different conditions that would approximate what happens in either the real world or a fantasy world. A physics engine can be used by other software programs for example games or animation software to enhance the way virtual objects imitate the real world to produce games and animations that are highly realistic or to create dream-world effects.

Figure 1:
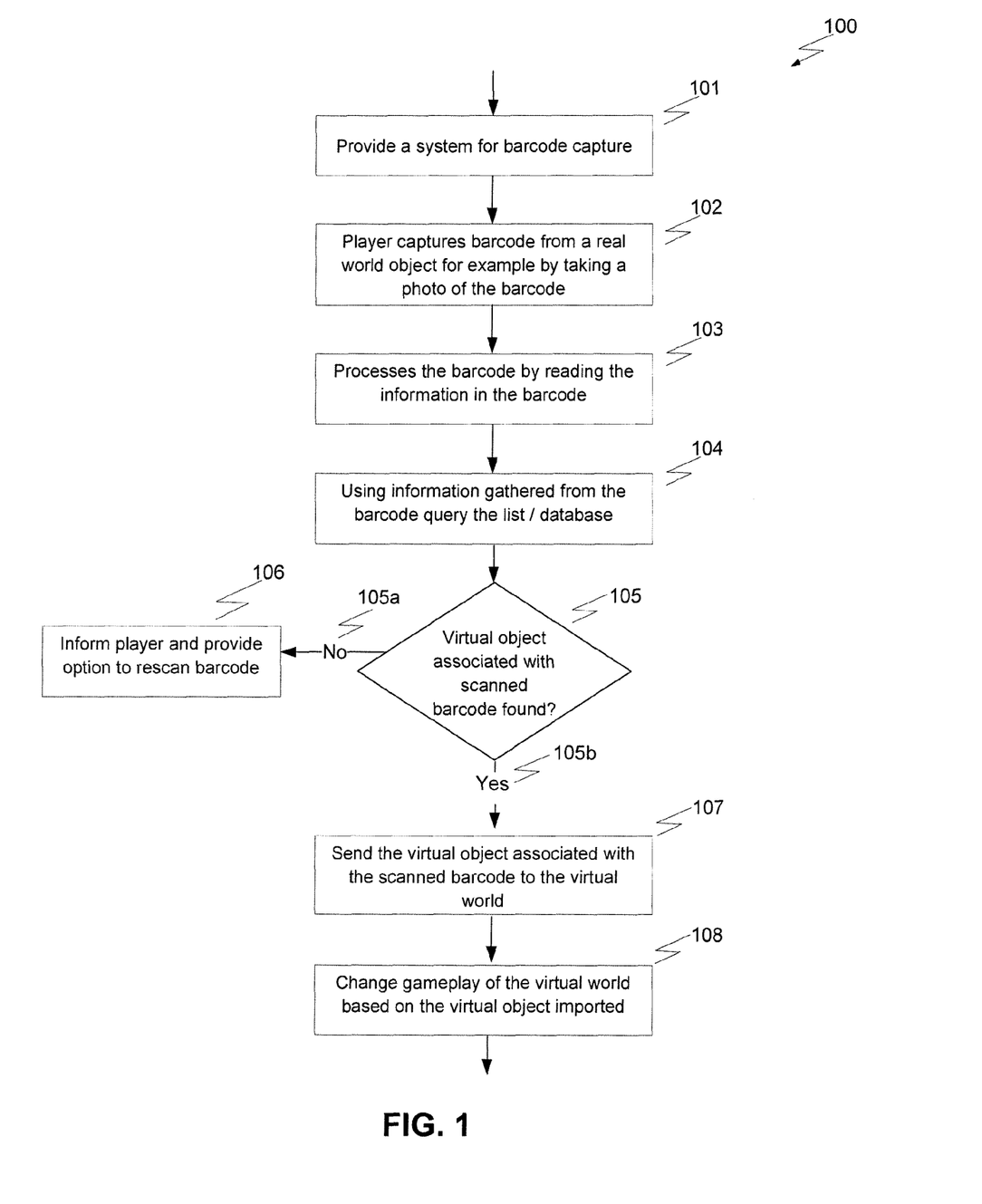
FIG. 1 is a flow diagram representing a first general concept of the invention.

FIG. 1 shows a first conceptual flow 100 of the invention.

A system for barcode capture is provided on a gaming device with a virtual world such that a player can import virtual objects into the virtual world by scanning barcodes from real world objects 101.

The barcodes are commonly found on consumer products and may be used for inventory control and assistance in entering pricing at the retail checkout counters.

A barcode is an optical machine-readable representation of data, which shows data about the object to which it is attached. A barcode is a precise arrangement of parallel lines (bars) and space that vary in width to represent data for identification purpose. Originally, barcodes represented data by varying the widths and spacing of parallel lines, and may be referred to as linear or 1 dimensional (1D). Barcodes have evolved to 2 dimensions (2D barcodes). Some 2D barcodes do not use bars at all, and may use rectangles, dots, hexagons and other geometric patterns instead of just lines (e.g. QR codes). Although 2D systems use a variety of symbols, they are generally referred to as barcodes as well. Barcodes may be scanned by special optical scanners called barcode readers. Barcode labels may be read with a scanner, which reflects light and interprets the code into numbers and letters that are passed on to a computer. Interpretive software applications are also available on devices including desktop printers and smartphones.

The mapping between messages and barcodes is called a symbology. The specification of a symbology includes the encoding of the single digits/characters of the message as well as the start and stop markers into bars and space, the size of the quiet zone required to be before and after the barcode as well as the computation of a checksum.

Linear symbologies can be classified mainly by two properties:

Continuous vs. discrete: Characters in continuous symbologies usually abut, with one character ending with a space and the next beginning with a bar, or vice versa. Characters in discrete symbologies begin and end with bars; the inter-character space is ignored, as long as it is not wide enough to look like the code ends.

Two-width vs. many-width: Bars and spaces in two-width symbologies are wide or narrow; how wide a wide bar is exactly has no significance as long as the symbology requirements for wide bars are adhered to (usually two to three times wider than a narrow bar). Bars and spaces in many-width symbologies are all multiples of a basic width called the module; most such codes use four widths of 1, 2, 3 and 4 modules.

Some symbologies use interleaving. The first character is encoded using black bars of varying width. The second character is then encoded, by varying the width of the white spaces between these bars. Thus characters are encoded in pairs over the same section of the barcode. Stacked symbologies repeat a given linear symbology vertically.

The most common among the many 2D symbologies are matrix codes, which feature square or dot-shaped modules arranged on a grid pattern. 2D symbologies also come in circular and other patterns.

In a linear barcode system, the code itself contains no information about the real world object to which the barcode is assigned, but represents a string of identifying numbers or letters. When the barcode is read by an optical scanner linked to a computer, the computer then provides the information about the real world object, such as its price or the quantity sold, from and to databases. Thus in one embodiment of the invention the information about the virtual objects is stored in a database, and our system can associate random virtual objects with a given barcode. In an alternate embodiment the relationship between a barcode and a virtual object may be fixed.

A 2D barcodes permit the encoding of information about an item in addition to an identifying code. In a 2D barcode, two axes, or directions, are used for recording and reading the codes and the bar size is reduced, increasing the space available for data in the way that a column of words improves on a column of letters.

In one embodiment of the invention, enough information about the virtual object may be encoded in a 2D symbology such that an intermediate database is not required to decipher what virtual object the barcode represents. In one embodiment of the invention this may be accomplished by having virtual object statistics encoded in the 2D barcode. Thus the virtual object can be either identified and invoked locally in a virtual world implementing the system of the invention without having to rely on an external lookup system.

Although a few exemplary barcode technologies are described above, the methods and systems described in this application are intended to work with any kind of a barcode technology.

There are several different technological ways of barcode deciphering, some of the more popular methods widely used in the industry are described below. These are examples and do not limit the invention, in fact the intent is to cover all such technologies for barcode deciphering.

Prior art methods of scanning barcodes with linear symbologies may use laser scanners, which sweep a light beam across the barcode in a straight line and then reading a slice of the barcode light-dark patterns. Laser scanning may also be used for stacked symbologies, in this case the laser makes multiple passes across the barcode. Thus in one embodiment of the invention, a barcode scanner may be used to scan the barcode on a real object to import a virtual object into a virtual world. The barcode scanner may be built in the gaming device, or may be detachably attachable to a gaming device e.g. a USB barcode scanner attached to a computer via the USB port.

Prior art methods of barcode deciphering using a video capture device (e.g. a camera) are also known. In one embodiment of the invention the system may use a video capture device built in a mobile device (e.g. an iPhone, iPad or other such device) to capture the barcode as an image and then processing this image either locally or remotely to decipher the information contained in the barcode to import a virtual object into a virtual world.

The player captures a barcode from a real world object (e.g. by taking a photo of the barcode on the real world object). If the gaming device supports another method, for example it incorporates a barcode scanner, then the player may use that method to obtain the information of the barcode 102.

The barcode is then processed by reading the information in the barcode 103.

Using information gathered from the barcode, the system can query a list/database of such barcodes 104 to get the information stored in the system regarding the barcode and the virtual object it may be associated with. It will be appreciated that there may be separate lists (one first lookup list for the barcode data linked to information about its real world object, and a second lookup list for the virtual object conversion from/concordance with the original barcode).

The system checks whether the database query found a virtual object associated with scanned barcode 105. If No 105a, then the system informs the player and may provide an option to rescan the barcode 106, or scan another object, or allow the system to import a virtual object matched with fuzzy logic, or a randomly assigned virtual object. The user may also have a role in associating a new virtual object with the barcode. In an example of "extreme customization", each barcode may be assigned by the player to his/her own choice of virtual object. In this way, the same game can have very different meanings for different players.

If Yes 105b, the system sends the virtual object associated with the scanned barcode to the virtual world 107. In one embodiment, the information may be sent over the Internet or other network to the gaming device. In another embodiment, the virtual object and related information may already be embedded in the virtual world. In such an embodiment, the virtual object associated with the scanned barcode is activated once an association is made.

In response to the virtual object, the gameplay of the virtual world is changed based on the virtual object imported 108. A virtual object may be defined by its function and form. The functional component of a virtual object describes its functional properties such as whether it is a weapon, whether it can be worn, where it can be worn, how heavy it is, and what special powers it has. In contrast, the form component of a virtual object describes the look, feel, and sound that are its characteristics. Virtual object can have some function within their virtual world, or can be solely used for aesthetic purposes, or can be both functional and decorative. The virtual character can be considered a special kind of a virtual object; it has a function, as well as a form and it represents a player and may also be controlled by the player.

An example of the functional component is shown when an imported virtual object may increase/decrease health of a virtual character. For instance if a roasted chicken is imported into the virtual world, it can increase the health of a virtual character, whereas importing fries and a burger (or a non-food item like laundry detergent) may decrease the health of a virtual character.

Health is a game mechanic used in virtual worlds to give a value to virtual characters, enemies, NPCs, (non player characters) and related virtual objects. Health is often abbreviated by HP which may stand for health points or hit points; it is also synonymous with damage points or heart points. In virtual worlds health is a finite value that can either be numerical, semi-numerical as in hit/health points, or arbitrary as in a life bar, and is used to determine how much damage (usually in terms of physical injury) a virtual character can withstand when said virtual character is attacked, or sustains a fall. The total damage dealt (which is also represented by a point value) is subtracted from the virtual character's current HP. Once the virtual character's HP reaches 0 (zero), the virtual character is usually unable to continue to fight or carry forward the virtual world's mission.

A typical life bar is a horizontal rectangle which may begin full of colour. As the virtual character is attacked and sustains damage or mistakes are made, health is reduced and the coloured area gradually reduces or changes colour, typically from green to red. At some point the life bar changes colour completely or looses colour, at this point the virtual character is usually considered dead.

At the start of a typical game, the virtual character may have 10 health and be surrounded by numerous enemies. Each enemy applies an attack influence (a force toward the enemy) and a flee influence (a force away from the enemy) to the virtual character. Given these circumstances, the attack influence would carry the strongest priority, and so we would expect the virtual character to move toward the closest enemy (since influence is inversely proportional to distance).

This default behaviour can be overridden by the player by scanning the barcode on a real world object, importing the equivalent virtual object (statistics) in the virtual world and incorporating these statistics to change the health of the virtual character.

An example of the form component is shown when an imported virtual object may change the way a virtual object/virtual character appears. For example when a barcode on a clothing item is scanned it changes the appearance of the virtual character e.g. scanning the barcode on a hat results in the virtual character to appear wearing an analogous hat.

A virtual world that incorporates the invention, either in its entirety or some components of it, may be a single player game or a multiplayer game or a MMORPG (Massively Multiplayer Online Role Playing Game) and may exist on any type of a gaming device which provides a either a video capture sensor (camera) or a barcode scanner built in it, and may include but not limited to an iPhone, iPad, Smartphones, Android phones, personal computers e.g. laptops, tablet computers, touchscreen computers, gaming consoles and online server based games.

The computer program comprises: a computer usable medium having computer usable program code, the computer usable program code comprises: computer usable program code for presenting graphically to the player the different options available to engage in gameplay via the touchscreen interface.

Several implementation possibilities exist. Some obvious ones are listed below, but there may be other methods obvious to the ones skilled in the art, and the intent is to cover all such scenarios. The application is not limited to the cited examples, but the intent is to cover all such areas that may be used in a virtual world to import virtual objects by scanning barcodes from real world objects.

Figure 2:
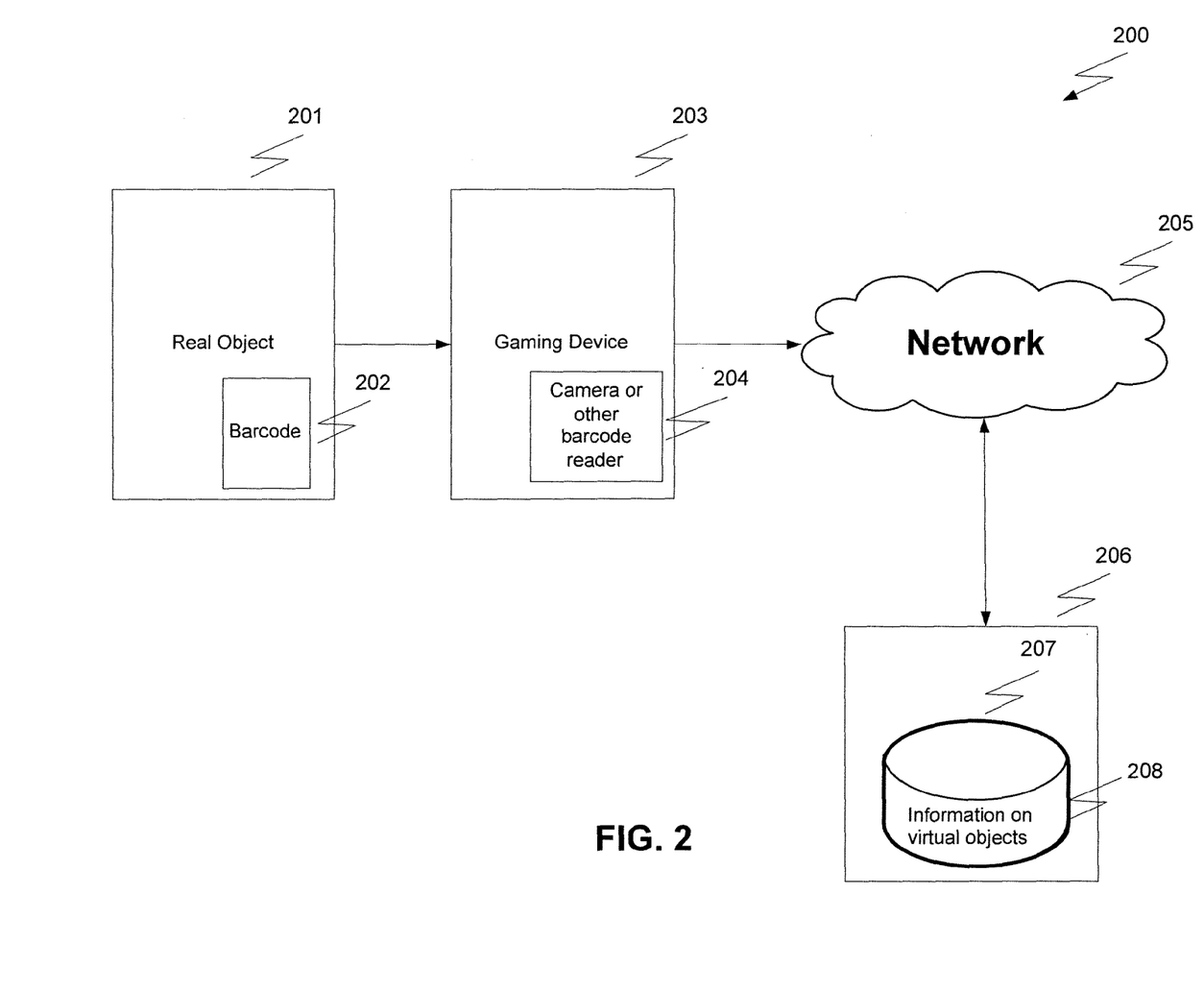
FIG. 2 is a network diagram showing the components of the invention, in one embodiment.

In one embodiment of the invention, the system may do remote processing on a backend server. FIG. 2 shows one such possibility.

A real world object 201 (e.g. a can of soup) with a barcode 202 is scanned by the player using the gaming device 203 (e.g. an iPhone) with a barcode capture device 204 (e.g. a camera). An image of the barcode 202 is taken and is sent to the backend server 206 over a network 205 (e.g. the Internet). Network 205 may be the Internet, LAN, a wireless LAN, Bluetooth network, a PSTN, wireless carrier network or other.

The backend server 206 deciphers the barcode information from the image of the barcode 202. The backend server 206 then queries a database 207 which has information on virtual object(s) 208 stored in it (or linked thereto), to find out what virtual object is associated with the barcode 202.

Once a virtual object associated with the barcode 202 has been identified, the backend server 206 then sends the virtual object (or information about the virtual object) to the virtual world. The user engages in gameplay and uses the imported virtual object to change the gameplay of the virtual world.

In one embodiment of the invention, there may be hybrid processing (e.g. part of the processing is done on the gaming device and part of the processing is done on a backend server). To elaborate such an implementation, consider when a player scans the barcode, the barcode is deciphered at the gaming device level to figure out what the barcode is all about, the information extracted from the barcode (e.g. virtual object name) is then sent to the backend server, the server then queries a database to see what virtual object is associated with the barcode, and then the server sends the virtual object (or related statistics) to the virtual world on the gaming device. The player engages in gameplay and uses the imported virtual object to change the gameplay of the virtual world.

In one embodiment of the invention, there may be a direct and rigid relationship between a barcode and the virtual object that is imported into the virtual world. For example, when a barcode on a can of soup is scanned, it imports a can of soup in the virtual world. In such a scenario, each time the barcode on the can of soup is scanned, the same virtual object is imported into the virtual world. Thus there may be a fixed relationship between the barcode and the virtual object.

In one embodiment of the invention, the imported virtual object may retain some of its characteristics from the real world. For example the soup when fed to a virtual character whose health is low, can be used to restore its health and extend the gameplay. In an alternate implementation, along with real characteristics there may be other (fantastical) characteristics that are also associated with the virtual object e.g. soup allows the virtual character to fly for a duration.

Figure 3:
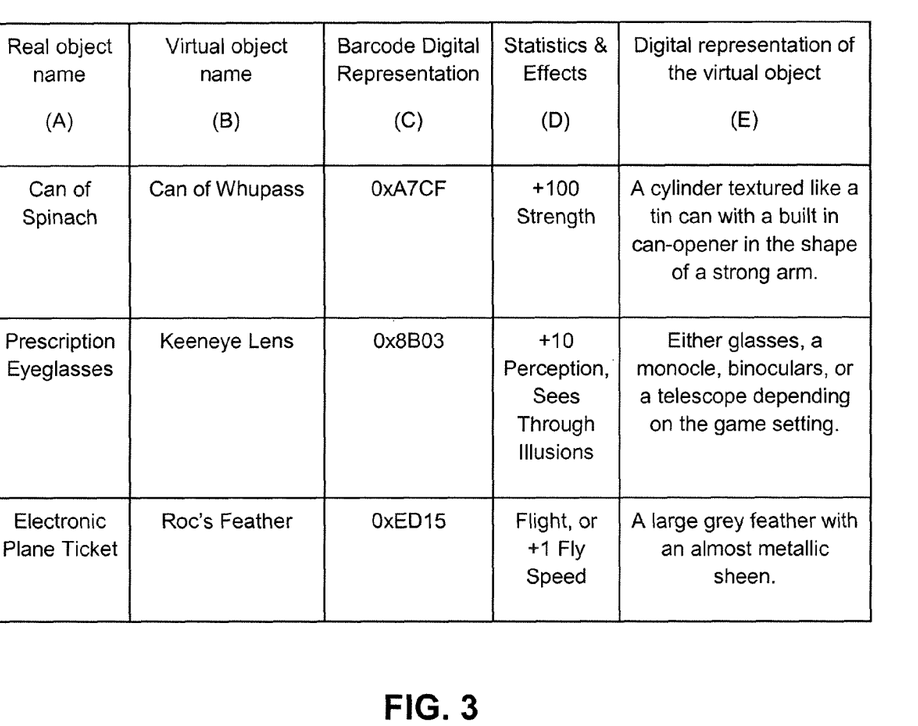
FIG. 3 is a table of values for a set of exemplary real world objects and corresponding virtual objects.

FIG. 3 shows a table with the information on sample real world and virtual objects 208.

Column (A) shows the real object name, this is the name of the real world object e.g. can of soup, chocolate bar, wrist watch, running shoes, etc.

Column (B) shows the virtual object name, this is the name of the virtual object that is either independent and may be randomly assigned when a barcode is scanned, or is associated with a given barcode. These can be pre-set or user created.

Column (C) shows Barcode Digital Representation, this is the information in the barcode, and/or may also define the association between the barcode and the virtual object. The relationship can be from an existing database of barcodes. This can be queried each time. In a preferred embodiment, once the virtual object is acquired, it can be stored in the virtual world (i.e. in the game environment), so that there is no need to query the database again.

Column (D) shows Statistics & Effects, as mentioned earlier statistics define the behaviour of the virtual object in the virtual world. These can be pre-set or user created.

Column (E) shows digital representation of the virtual object, this may include digital photos of the virtual object including one or more aspects, a thumbnail, etc.

Several examples of a player scanned real world objects and their impact on gameplay when the virtual objects are imported into the virtual world are given below.

In one embodiment of the invention, there may an arbitrary relationship between the scanned real world object and the imported virtual object. Thus the system of the invention may either randomly or in any other way associate a barcode scan with a virtual object.

In another embodiment of the invention, when a barcode on a real world object is scanned by a player, a virtual object is selected from a list (or a collection) of virtual objects. Thus on each barcode scan a different item from the list (or collection) is selected.

In one embodiment of the invention, the virtual objects that can be imported into a virtual world are pre-populated in a database (either local or remote).

In another embodiment of the invention, the system may provide for virtual objects to be added by a player by taking one or more digital photographs (or digital representations) of a real object, the barcode and then uploading these digital items to the server optionally with some textual description to describe the virtual object.

In one embodiment of the invention, virtual objects may be added by a third party e.g. a company who may be interested in advertising and promoting their wares in a virtual world. Thus when a player scans the barcode on one of these branded real world objects e.g. running shoes, the virtual object (branded virtual shoes) is then imported into the virtual world. Thus a player in one embodiment may pay to import the branded virtual object into the virtual world. To incent a player to pay for branded virtual objects, when importing branded virtual objects in a virtual world, virtual characters may be imbued with extra-ordinary powers for example when using branded running shoes, the virtual character may be able to run faster than it normally does. Such extra-ordinary powers can be imparted to the virtual character by changing the statistics of the virtual character/object.

In one embodiment of the invention, there may be one or more barcodes on a real world object, where one barcode may be used for the typical retail checkout counter scenario, while the other barcode(s) may be used for importing the virtual object into a virtual world. Barcodes may also be enclosed within packaged real world objects e.g. inside a cereal box.

Thus requiring that a player purchases a real world object, open the packaging and then access the barcode to import a virtual object into a virtual world. Alternatively, barcodes may be provided in an object linked to a real-world object (e.g. a coupon, advertisement, a gift card/certificate, a trading card, etc.).

In one embodiment of the invention, a non-gaming application may also use the system and method disclosed in this application. For example, an application for a mobile device like an iPhone or other similar device where a user may scan the barcode by taking a photo of a real world object e.g. a food item such as an apple, and the application then displays to the user more information about the scanned item e.g. origin of the product, caloric value, comparative price at another close by vendor or online vendor etc. The said mobile device may connect to a backend server using a network e.g. WiFi or wireless network of a service provider etc.

In another embodiment of the invention, the gaming device and the virtual world that may exists on it may be capable of performing the barcode deciphering locally without requiring a backend server. In one such embodiment, the virtual objects that can be invoked by scanning the barcodes are already embedded in the virtual world. When a player scans a barcode, it invokes the corresponding virtual object already embedded in the virtual world. The player engages in the gameplay of the virtual world and uses the invoked virtual object to change the gameplay of the virtual world. In an alternate embodiment, a 2D barcode may incorporate the statistics for a virtual object, thus the generic virtual object that is already embedded in the virtual world can be customized using the statistics deciphered from a 2D barcode.

For example, the generic virtual object that is embedded in the virtual world may be a generic apple. The barcode then supplies the particular information (e.g. via statistics) that can be used to customize the already embedded generic virtual object. Thus the player scans a barcode and it provides the information about the variety of the apple e.g. granny smith, its country of origin, caloric and other nutritional information etc. which can then be used to customizes the already embedded generic virtual object. This extra information may come from statistics either received from a server or deciphered from a 2D barcode.

In some cases (e.g. when no network connectivity is available), it may be advantageous to decipher the barcode information locally. In order to make this possible, the virtual world may have pre-embedded generic virtual objects. When the barcode is scanned, the stats may be embedded in the barcode itself. Since there is a generic virtual object available locally, it will take only a few more stats to make it more particular. For example, the embedded generic apple is green. by only changing the stat associated with color, it can be made specific. For example, the barcode provided a stat that specifies color red, and by replacing one stat that already exists (green) with the one acquired from the barcode (red), the generic green apple can be made red in the game. By a similar process, changing a few more stats can permit even more complex changes.

In an exemplary game using the disclosed invention, a player may battle enemies whose statistics are determined by the real world objects they scan. Barcodes on lower priced real world objects typically correspond to lower level enemies, while the opposite is true for higher priced items. Thus, a player may begin fighting the "Dreaded Sock Puppet" in a clothing store, before becoming powerful enough to face the "Lawn Mower Reaver" in the hardware store, or the "Divinely Complete Dining Room Set" in the home furnishings store. Enemies may or may not correspond to the items that are scanned to unlock them, so the statistics of an enemy generated from the barcode of a lawn mower may have nothing to do with a lawnmower.

In another exemplary game a player may be expected to feed a virtual character in a virtual world, the same real world food items that the player is purchasing for personal consumption. The quality of the food (junk food vs. healthy food) then defines the final health of the virtual character. In a variation one such application can be used for tracking the health of a player who is represented in the virtual world as a virtual character. Preferably the said application may be used to model "what if" scenarios. Preferably such an application may require that the player provides current weight, height, body mass index, level of exercise etc. By representing the player as a virtual character in the application (virtual world), the player's real life statistics, may be modeled. For example the player may scan barcodes on certain food items that he may wish to consume. The resulting effect can be shown on the virtual character representing the player. Thus a player can estimate if consuming these items will actually help reduce weight or gain muscle mass or improve/deteriorate health. A dramatic death of the virtual game character might thus serve as a wake-up call to the real world player.

One embodiment of the invention may preferably also provide a framework or an API (Application Programming Interface) for virtual world creation that allows a developer to incorporate the functionality of interacting with virtual objects using multi-touch. Using such a framework or API allows for a more uniform virtual world generation, and eventually allows for more complex and extensive ability to interact with virtual objects.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, we singled out game applications for our examples. Similarly we described users of these applications as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to the ones skilled in the art.

Although interacting with virtual objects is has been exemplified above with reference to gaming, it should be noted that virtual objects are also associated with many industries and applications. For example, virtual worlds/objects can be used in movies, cartoons, computer simulations, and video simulations, among others. All of these industries and applications would benefit from the disclosed invention.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

What is claimed is:

1. A method of enabling virtual gameplay on a computing device in communication with a data storage medium, the method comprising the steps of:

providing a video game environment on the computing device, enabling a player to play a game via a character;

receiving, via an input device in communication with the computing device, an input of a barcode scanned from a real world object not created for use in the game, by the player, and storing the barcode on the data storage medium;

querying, via the computing device, a database of barcodes to determine particulars of the real world object that was scanned;

retrieving, via the computing device, a virtual object from the data storage medium based on the barcode input by matching the particulars of the real world object to a corresponding virtual object; and allowing the player's character to own or interact with the virtual object in the game environment;

wherein the retrieving step includes determining a general category or class of the scanned real world object in the real world, and wherein the virtual object is assigned from an equivalent or similar general category or class in the game environment.

2. The method of claim 1, wherein the retrieving step includes importing the virtual object from a virtual object database.

3. The method of claim 1, wherein the retrieving step includes importing statistics representing the virtual object from a virtual object database.

4. The method of claim 1, wherein the retrieving step includes unlocking the virtual object in the game environment.

5. The method of claim 1, further comprising increasing or decreasing, via the computing device, at least one player character statistic as a consequence of retrieving the virtual object.

6. The method of claim 1, further comprising retrieving, via the computing device, other data at the same time as the real world object is scanned.

7. The method of claim 6, wherein the other data includes location of the real world object or the player, and the location is incorporated into the gameplay of the game.

8. The method of claim 6, wherein the other data includes a price or value of the real world object, and the price or value is represented in the character's points or treasury or in other currency of the game.

9. The method of claim 1, further comprising determining, via the computing device, that the real world object is consumable, and wherein the character is able to consume the virtual object in the game.

10. The method of claim 9, wherein the real world object is a food, and the character is shown in the game eating or having eaten the food.

11. The method of claim 10, wherein eating the food increases or decreases at least one player character statistic.

12. The method of claim 1, wherein the real world object is a non-food item, and wherein the character is able to consume the virtual object in the game.

13. The method of claim 12, wherein the character is shown in the game experiencing a magical, drugged, toxic, or poisoned effect from eating or having eaten the non-food item.

14. The method of claim 12, wherein eating the non-food item increases or decreases at least one player character statistic.

15. The method of claim 1, wherein retrieval of the barcode occurs during or before the start of the game.

16. The method of claim 1, wherein retrieval of the barcode is initiated by the player or directed by the game in response to a scarcity or low value of at least one statistic in the game.

17. The method of claim 1, wherein the game directs what type of real world object should be scanned.

18. The method of claim 1, wherein the game includes a treasure hunt or scavenger hunt motif.

19. The method of claim 1, wherein the virtual object is to be retrieved with other virtual objects as a set or in a particular order for a game purpose.

20. The method of claim 1, wherein a graphical representation of the real world object is retrieved.

21. The method of claim 1, wherein the data storage medium is provided by one or a combination of: a local fixed memory, a local removable memory, a remote fixed memory, a remote removable memory, and a virtual memory.

22. The method of claim 1, wherein the data storage medium is selected from the group consisting of: a local data storage of a game console, a local inbuilt memory, a user provided memory, an online server, and a shared folder on a network.

23. The method of claim 1, wherein the player is enabled to play the game using a game device, and the barcode is scanned by an on-board scanner or camera on the game device.

24. The method of claim 1, wherein the game device is a mobile device.

25. The method of claim 1, wherein the particulars include a brand name of the real world object.

26. The method of claim 25, wherein the database includes real world objects of different brand names.

* * * * *

UNITED STATES PATENT AND TRADEMARK OFFICE
CERTIFICATE OF CORRECTION

PATENT NO.         : 8,882,595 B2
APPLICATION NO.    : 13/456716
DATED              : November 11, 2014
INVENTOR(S)        : Chowdhary et al.

Page 1 of 1

It is certified that error appears in the above-identified patent and that said Letters Patent is hereby corrected as shown below:

On The Title Page, item (73) Assignee should read: 2343127 Ontario Inc., Toronto, Ontario (CA)

Signed and Sealed this
Seventeenth Day of March, 2015

Michelle K. Lee
*Director of the United States Patent and Trademark Office*